United States Patent
Gordon et al.

(10) Patent No.: US 10,081,426 B2
(45) Date of Patent: *Sep. 25, 2018

(54) DRONE-BASED MOSQUITO AMELIORATION BASED ON RISK ANALYSIS AND PATTERN CLASSIFIERS

(71) Applicant: International Business Machines Corporation, Armonk, NY (US)

(72) Inventors: Michael S. Gordon, Yorktown Heights, NY (US); James R. Kozloski, New Fairfield, CT (US); Clifford A. Pickover, Yorktown Heights, NY (US); Justin D. Weisz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,579

(22) Filed: Nov. 3, 2017

(65) Prior Publication Data
US 2018/0065748 A1    Mar. 8, 2018

Related U.S. Application Data

(63) Continuation of application No. 15/220,500, filed on Jul. 27, 2016, now Pat. No. 9,856,020.

(51) Int. Cl.
*B64D 1/18* (2006.01)
*G05D 1/10* (2006.01)
(Continued)

(52) U.S. Cl.
CPC ............ *B64D 1/18* (2013.01); *B64C 39/024* (2013.01); *G05D 1/101* (2013.01); *G06K 9/6267* (2013.01);
(Continued)

(58) Field of Classification Search
CPC ........ B64D 1/18; B64C 39/024; G05D 1/101; G06K 9/6267; G06K 9/66; G06N 3/08
(Continued)

(56) References Cited

U.S. PATENT DOCUMENTS 8,967,029 B1 *   3/2015   Calvert ................... F41H 13/00
                                                            239/171
9,600,997 B1 *   3/2017   Abrahams ............... G08B 21/10
(Continued)

FOREIGN PATENT DOCUMENTS

| CN | 102897323 A | 1/2013 |
| CN | 202863767 U | 4/2013 |
| CN | 202863768 U | 4/2013 |

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Yazan Soofi
(74) *Attorney, Agent, or Firm* — Law Office of Jim Boice

(57) ABSTRACT

A method, system, and/or computer program product ameliorates mosquito populations. A flying drone is deployed over an area. Sensor readings that identify a presence of water in the area are received, and one or more processors determine a confidence level L that the water in the area is stagnant water. The flying drone is then directed to perform an amelioration action against the mosquito larvae based a value of the determined confidence level L.

20 Claims, 7 Drawing Sheets

(51) Int. Cl.
*G06K 9/66* (2006.01)
*G06N 3/08* (2006.01)
*G06K 9/62* (2006.01)
*B64C 39/02* (2006.01)

(52) U.S. Cl.
CPC .................. *G06K 9/66* (2013.01); *G06N 3/08* (2013.01); *B64C 2201/108* (2013.01); *B64C 2201/12* (2013.01); *B64C 2201/141* (2013.01); *B64C 2201/146* (2013.01)

(58) Field of Classification Search
USPC .......................................................... 701/3
See application file for complete search history.

(56) References Cited

U.S. PATENT DOCUMENTS

| 2009/0205363 | A1  | 8/2009 | de Strulle |              |
|--------------|-----|--------|------------|--------------|
| 2012/0196304 | A1  | 8/2012 | Dees et al.|              |
| 2013/0047497 | A1* | 2/2013 | White      | A01M 1/20    |
|              |     |        |            | 43/131       |
| 2014/0237951 | A1* | 8/2014 | Szydlowski | A23L 2/00    |
|              |     |        |            | 53/473       |

OTHER PUBLICATIONS

N. Owano, "Florida mulls drone war on the mosquito", Tech Xplore, phys.org, Aug. 14, 2013, pp. 1-2.
C. Szegedy, "Deep Neural Networks for Object Detection", Conference: Advances in Neural Information Processing Systems 26, 2013, pp. 2553-2561.
Anonymous, "Mosquito Laser" wikipedia.org, Wikimedia Foundation, Inc., last modified Jul. 21, 2016, retrieved Jul. 27, 2016, pp. 1-5.
Anonymous, "Mosquito Magnet(R) Executive Mosquito Trap", mosquitomagnet.com, Woodstream Corporation, 2016, pp. 1-4.
Anonymous, "Florida Wants to Deploy Drone Fleet to Help Kill Mosquitoes", rt.com, Autonomous Nonprofit Organization, Aug. 15, 2013, pp. 1-2.
Associated Press, "FAA Authorizes Drone Use for Mosquito Control in the Keys", Associated Press, The Washington Times, LLC, Jan. 2, 2015, one page.
Bittel, Jason. "Mosquito-Hunting Infrared Drones of the Future Are a Total Letdown". Future Tense, The Citizen's Guide to the Future, Aug. 15, 2013.
List of IBM Patents or Patent Applications Treated as Related. Oct. 18, 2017.

* cited by examiner

US 10,081,426 B2

DRONE-BASED MOSQUITO AMELIORATION BASED ON RISK ANALYSIS AND PATTERN CLASSIFIERS

BACKGROUND

The present disclosure relates to the field of flying drones, and specifically to flying drones that are capable of abating insects. More specifically, the present disclosure relates to the user of a flying drone to abate and/or ameliorate insects such as mosquitoes.

A flying drone is an unmanned aircraft, also known as an unmanned aerial vehicle (UAV). That is, a flying drone is an airborne vehicle that is capable of being piloted without an on-board human pilot. If autonomously controlled using an on-board computer and pre-programmed instructions, a UAV is called an autonomous drone. If remotely piloted by a human pilot, the UAV is called a remotely piloted aircraft (RPA).

SUMMARY

In one or more embodiments of the present invention, a method, system, and/or computer program product ameliorates mosquito populations. A flying drone is deployed over an area. Sensor readings that identify a presence of water in the area are received, and one or more processors determine a confidence level L that the water in the area is stagnant water. The flying drone is then directed to perform an amelioration action against the mosquito larvae based a value of the determined confidence level L.

DETAILED DESCRIPTION

Figure 1:
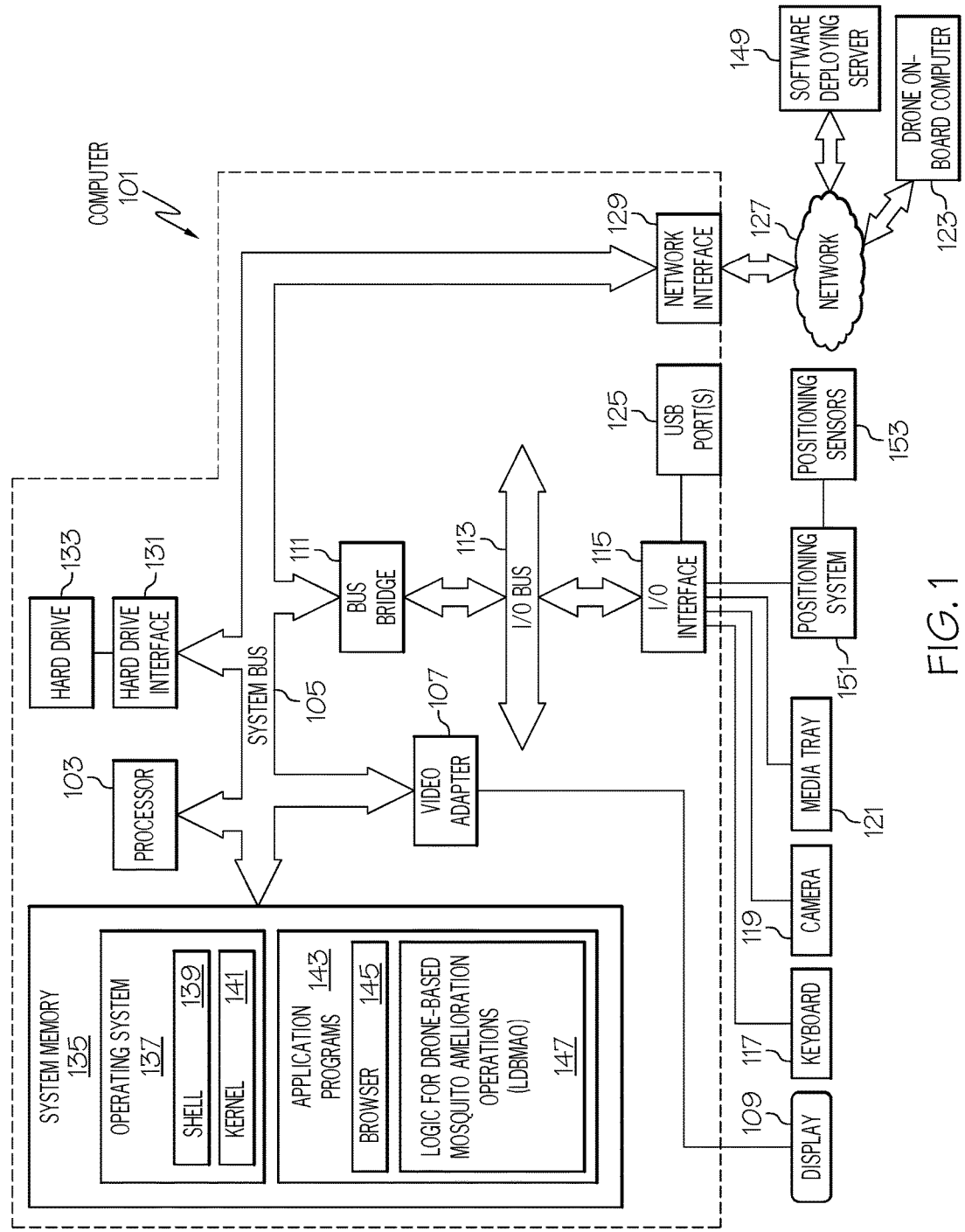
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Disclosed herein is a method and system that includes a flying drone, a means for the flying drone to detect stagnant water with confidence level L, a means for estimating mosquito (and larva) risk R of stagnant water, and then, based on R and L, the drone taking an amelioration action. The amelioration action may include deploying insecticide, agitating the water, deploying safe/natural/approved larvacides, and many other options described herein. A pattern classifier and/or deep neural network are used to estimate L and R based on images seen by the drone (e.g. looking for birdbaths, tires on a property), etc.

Mosquitoes prefer stagnant water upon which they lay their eggs (which become larvae). Such stagnant water may be in ponds, marshes, swamps and other wetland habitats. However, mosquitoes are also capable of thriving in a variety of non-natural water locations, such as birdbaths, abandoned automobile tires, drainage ditches, etc. Thus, species of mosquitoes such as Anopheles, Culex, Culiseta, Coquillettidia and Uranotaenia breed in any type of stagnant body of water, including fresh water, polluted water, acid water, brackish water (e.g., in swamps), etc. Mosquitoes can even lay their eggs on leaves.

Thus, the present invention utilizes a pattern classifier enabled by a deep neural network to identify waters capable of supporting mosquito larvae, and to estimate levels of risk that such waters are currently supporting mosquito eggs/larvae based on images and/or sensor readings from a flying drone. Images and/or sensors may include conventional cameras, GPS devices, and onboard maps of bodies of water, infectious disease likelihood maps, etc. Additional sensors may include multispectral cameras for better identifying stagnant water, stereoscopic cameras, microscopic cameras, radar imaging devices, Light Imaging Detection And Ranging (LIDAR) imaging devices, audio recording devices, onboard chemical sensors, water sample testing sensors, and humidity sensors.

A deep neural network utilizes a set of algorithms, modeled loosely after the human brain, that are designed to recognize patterns. These algorithms interpret sensory data through machine perception. That is, a deep neural network is composed of a network of nodes that interact by sending nodal outputs to one another, thus leading to a heuristic network that emulates how a human brain works. This allows the deep neural network to recognize patterns, learn new information, etc.

Thus, deep neural networks provide a platform for clustering and classifying data according to 1) similarities in the data and 2) how nodes that process the data affect other nodes (again, much like a human brain's interplay between synaptic connections lead to cognition, pattern recognition, etc.), using one or more combinations of reinforcement learning, classification and/or analytical regression.

One use of deep neural networks is to classify images based on their features. For example and in the present invention, a deep neural network is able to receive data describing a particular body of water, classify features of that body of water, and then perform a cognitive analysis of the features of that body of water (e.g., its level of stagnation, pollution, temperature, etc.) that are conducive to supporting mosquito eggs/larvae.

Unchecked mosquito populations present multiple health hazards, which lead to disease, economic impact, political upheaval, etc. That is, mosquitoes are capable of transmitting (vectoring) diseases such as the Zika virus, West Nile virus, Saint Louis encephalitis virus, Eastern equine encephalomyelitis virus, Everglades virus, Highlands J virus, La Crosse Encephalitis virus, dengue fever, yellow fever, Ilheus virus, malaria, filariasis, Rift Valley fever, Wuchereria bancrofti, Japanese Encephalitis, chikungunya, malaria, filariasis, and Murray Valley encephalitis.

Thus, the present invention provides a new and useful solution to ameliorating the problems presented by unchecked mosquito populations.

As described herein, a pattern classifier uses a deep neural network to estimate a confidence level L of a particular body of water being stagnant based on images and/or other sensor readings for the body of water, and a risk R of mosquito larvae being present in the particular body of water based on images seen by a flying drone (e.g. looking for birdbaths, tires on a property, etc.) and/or the confidence level L.

In an embodiment of the present invention, a human observer provides real-time feedback on L and R based on receiving real-time imagery from the flying drone, receiving the flying drone's ratings of L and R, and updating the estimates of L and R using their observations and domain knowledge.

R and L may also depend on economic factors, such as homes being foreclosed, which tend to lead to unkempt properties. That is, in an embodiment of the present invention, the values of L (and thus R) may be determined, or at least influenced, by certain economic factors. Thus, if a flying drone sees standing water around a house that is known to be in foreclosure (and thus unoccupied), then the level of L is increased, since an assumption is made that there are no persons monitoring the landscape around that property for standing water and the amelioration thereof.

The present invention utilizes one or more amelioration actions to reduce the potential for mosquito eggs/larvae, including but not limited to spraying a pesticide on the water, introducing biological control agents (e.g., larvae eating fish), trapping the mosquitoes and/or the larvae, etc. Mosquito traps may include the use of sources of carbon dioxide emission in the trap to lure mosquitoes.

Biological control agents employed by the flying drone may use natural enemies to manage mosquito populations (predatory fish that feed on mosquito larvae such as mosquito fish, with care so as not to adversely affect an ecosystem). Other predators include dragonfly naiads, dead spores of the soil bacterium *Bacillus thuringiensis*, etc.

The flying drone may deposit biological controls to reduce the egg/larvae population. An exemplary biological control may use a slowly released package of *Bacillus thuringiensis* israelensis (Bti), which is a long lasting biological mosquito larvicide.

The flying drone may also control mosquito populations with various traps, such as an ovitrap that provides artificial breeding spots for mosquitoes to lay their eggs. These ovitraps also have a chemical inside the trap that will kill the adult mosquito and/or the larvae that have been laid in the trap. Such flying drone-deployed mosquito traps may emit a plume of carbon dioxide together with other mosquito attractants such as sugary scents, lactic acid, octenol, warmth, water vapor and sounds.

Mosquito lasers may be used to destroy a mosquito before it lays its eggs. Such mosquito lasers use a system of visual image detectors that identify the mosquito, leading to the aiming and firing of a low-intensity laser (e.g., a blue laser such as used in an optical storage device) that is nonetheless lethal to the mosquito.

The flying drone may have an electrical discharge insect control system, an electric insect killer or (insect) electrocutor trap, and/or a device that attracts and kills flying insects that are attracted by light being emitted from the flying drone.

The flying drone may contain one or more liquid pesticide storage tanks, which contain pesticides that are sprayed on the mosquitoes and/or the eggs/larvae that they have laid. A pipette and a high-pressure spraying device may be mounted on the flying drone in order to spray the liquid pesticide.

In an embodiment of the present invention, the flying drone may send navigation instructions to another device (airborne or land based) vectoring that other device to the location of the stagnant water (and thus the mosquito eggs/larvae).

In an embodiment of the present invention, a mosquito eradication projectile computer control system is used to trigger a mosquito eradication projectile launching into (for example) static shallow waters to eradicate mosquito larvae.

In one or more embodiments of the present invention, infrared sensors on the flying drone are used to detect shallow pools where mosquitoes breed. That is, a heat sensor on the flying drone will detect that a body of water is above a certain temperature, indicating that it is too shallow to dissipate heat to water below the surface, and thus is a good (shallow) breeding ground for mosquitoes to lay their eggs.

In an embodiment of the present invention, multiple flying drones work in concert to identify mosquito breeding grounds and/or deploy amelioration methods (e.g., two or more drones may be needed to properly cover a large area of stagnant water).

In an embodiment of the present invention, a human spotter may identify mosquito breeding grounds and direct one or more drones to deploy mosquito traps or other amelioration methods.

In one or more embodiments of the present invention, the deep neural network described above provides a cognitive engine that learns the behavior of the people/animals surrounding a property and learns the likelihood of puddle formation after a storm. For example, a family might cover their backyard pool every Labor Day (and uncover the pool on Memorial Day). The pool cover is likely to sag in one or more areas that are prone to collect water after a rainstorm. This rain translates into a puddle of water of a given depth. The system realizes that there is no need for the drone to look near the pool when the cover is off, but will evaluate the location when the cover is on (and thus is likely to accumulate pools of standing water). This cognitive engine can learn about the formation of the puddle based on the weather forecast, and about the evaporation rate of the puddle based on temperature and humidity.

In one or more embodiments of the present invention, the system focuses on pool covers, boat covers, and other types of outdoor protective covers (as well as other potential sources of accumulating water such as low water spots in a backyard, outdoor pet bowls, etc.) based on a calendar. For example and in one embodiment, if a weather calendar indicates that a certain month is 1) more likely to have mosquitoes in the area and 2) is more likely to have enough rain to accumulate in a cover, then the flying drone will investigate any detected (i.e., viewed by sensors) cover to determine if there is any water accumulation on that detected cover. In another example and embodiment, a personal calendar indicates that an owner/user of the cover is away from the location of the cover (e.g., the owner/user is on vacation and therefore is not at home where the cover is located). Based on this information, the flying drone will look for water accumulations on this cover based solely on the calendar of the owner/user.

In an embodiment of the present invention, drone-based testing and mapping of infectious mosquitoes is provided. That is, during the course of operation of the flying drone, the opportunity may arise to capture, catalogue, and map the presence of mosquitoes in a certain area, thus leading to the identification of an infestation of mosquitoes. In addition to recognizing such an infestation, the flying drone can also capture and/or deliver mosquito samples in a uniquely identified internal capsule, which includes a location device (e.g., a global positioning system—GPS device) that identifies where the mosquitoes and/or their larvae were captured. The vials may then be delivered to a remote location for testing for various disease vectors (e.g., Zika, malaria, etc.). The flying drone may also possess a simple on-board testing facility, in which case storage of samples in vials is not required. The map of infection carrying mosquito infestation is then populated with samples from drones in an area to further inform and rank the importance of ameliorative actions in one area versus another.

Thus, in one or more embodiments of the present invention a system includes a flying drone, a means for drone detecting stagnant water with a confidence level L, a means for estimating a mosquito (and larva) risk R of stagnant water, such that based on R and L the drone takes an amelioration action. Various types of amelioration action include the flying drone deploying an insecticide, agitating the water (e.g. aeration, stirring, etc.), deploying citronella, etc.

The system uses a pattern classifier that incorporates a deep neural network to estimate L and R based on images seen by a drone (e.g. looking for birdbaths, tires on a property), etc., and/or based on economic factors, such as a home being foreclosed, which tends to lead to unkempt properties.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by drone on-board computer 123 and/or software deploying server 149 and/or positioning system 151 shown in FIG. 1, and/or drone on-board computer 223 shown in FIG. 2, and/or drone on-board computer 323 shown in FIG. 3, and/or drone manager 401 and/or drone on-board computer 423 shown in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a camera 119 (i.e., a digital camera capable of capturing still and moving images), a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

Also coupled to I/O interface 115 is a positioning system 151, which determines a position of computer 101 and/or other devices using positioning sensors 153. Positioning sensors 153, may be any type of sensors that are able to determine a position of a device, including computer 101, a flying drone 200 shown in FIG. 2, etc. Positioning sensors 153 may utilize, without limitation, satellite based positioning devices (e.g., global positioning system—GPS based devices), accelerometers (to measure change in movement), barometers (to measure changes in altitude), etc.

As depicted, computer 101 is able to communicate with a software deploying server 149 and/or other devices/systems (e.g., drone on-board computer 123) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Logic for Drone-Based Mosquito Amelioration Operations (LDBMAO) 147. LDBMAO 147 includes code for implementing the processes described below, including those described in FIGS. 2-5. In one embodiment, computer 101 is able to download LDBMAO 147 from software deploying server 149, including in an on-demand basis, wherein the code in LDBMAO 147 is not downloaded until needed for execution. In one embodiment of the present invention, software deploying server 149 performs all of the functions associated with the present invention (including execution of LDBMAO 147), thus freeing computer 101 from having to use its own internal computing resources to execute LDBMAO 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
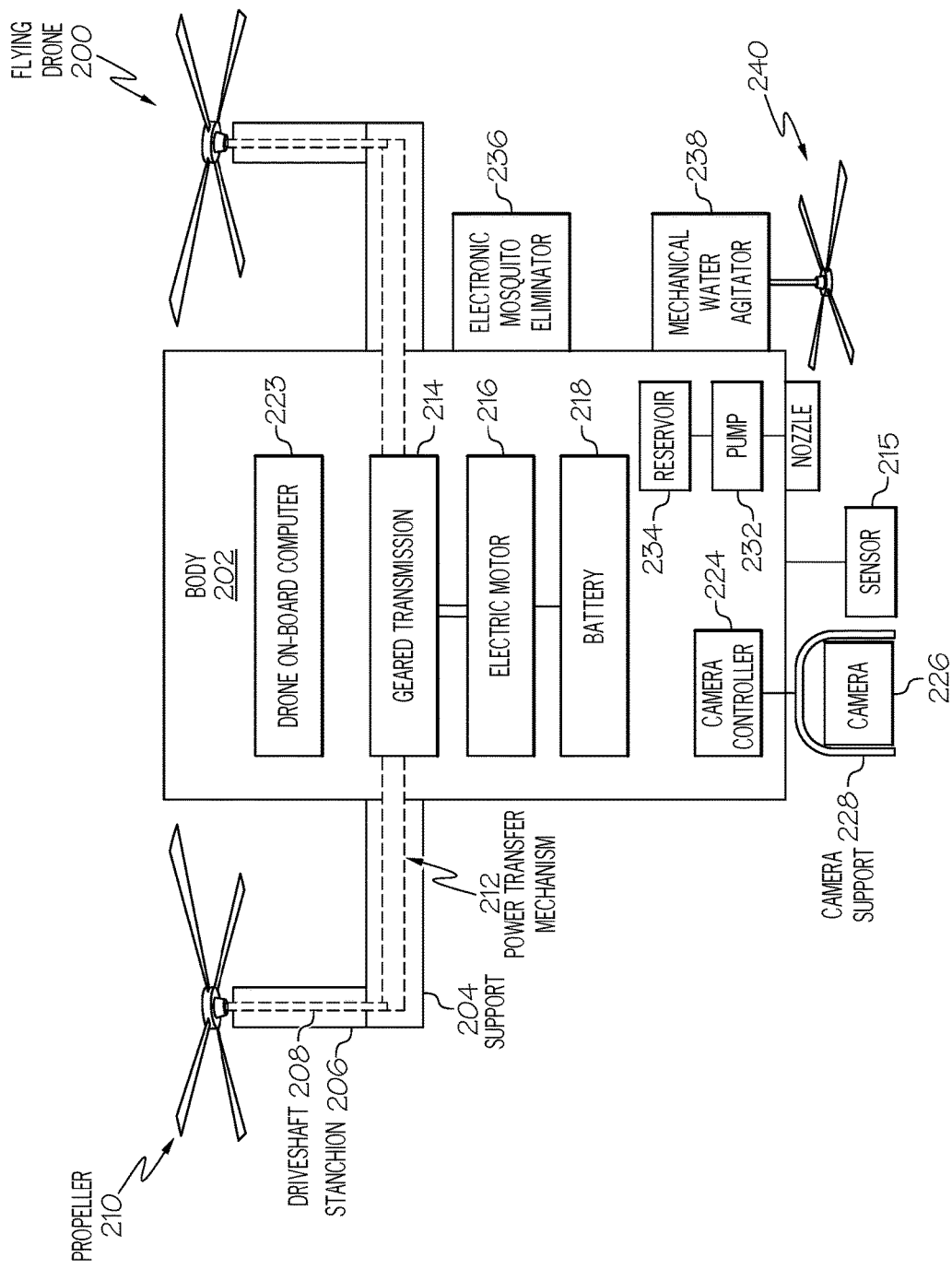
FIG. 2 depicts additional detail of an exemplary flying drone in accordance with one or more embodiments of the present invention.

FIG. 2 illustrates an exemplary flying drone 200 in accordance with one or more embodiments of the present invention. The terms "flying drone", "drone", "aerial drone", and "unmanned aerial vehicle" ("UAV") are used interchangeably herein to identify and describe an airborne vehicle that is capable of pilot-less flight and abating/ameliorating a mosquito/pest problem as described herein.

As shown in FIG. 2, flying drone 200 includes a body 202, which is attached to supports such as support 204. Supports such as support 204 support stanchions such as stanchion 206. Such stanchions provide a housing for a driveshaft within each of the stanchions, such as the depicted driveshaft 208 within stanchion 206. These driveshafts are connected to propellers. For example, driveshaft 208 within stanchion 206 is connected to propeller 210.

A power transfer mechanism 212 (e.g., a chain, a primary driveshaft, etc.) transfers power from a geared transmission 214 to the driveshafts within the stanchions (e.g., from geared transmission 214 to the driveshaft 208 inside stanchion 206), such that propeller 210 is turned, thus providing lift and steering to the flying drone 200. Geared transmission 214 preferably contains a plurality of gears, such that a gear ratio inside geared transmission 214 can be selectively changed.

Power to the geared transmission 214 may be provided by an electric motor 216, which is quieter than an internal combustion engine, and thus is better suited for certain environments (e.g., ecologically sensitive regions, residential areas, etc.). However, in an alternate example, an internal combustion engine may be used to provide additional travel range, etc.

Affixed to the bottom of body 202 is a camera controller 224, which is logic that controls movement of a camera 226 via a camera support 228 (which includes actuators, not shown, for movement of camera 226). The camera controller 224 is able to focus, as well as aim camera 226, while under the control of a drone on-board computer 223 (analogous to drone on-board computer 123 shown in FIG. 1). Camera 226 may be a still camera, a video camera, a camera capable of capturing and storing images, a camera capable of live-streaming images (still or moving), etc. Camera 226 may be capable of capturing visible light images, infrared (heat) images, etc. Thus, camera 226 can detect the physical appearance as well as the heat signature of a body of water.

In a preferred embodiment, drone on-board computer 223 controls all components of flying drone 200 depicted in FIG. 2, and/or performs all or some of the analytics described herein.

Also affixed to the body 202 of flying drone 200 is a nozzle 230, which receives pumped material (by a pump 232) from a reservoir 234. In various embodiments of the present invention, the material stored in reservoir 234 is a powder, a liquid, or a slurry (i.e., a combination of liquid and powder).

While flying drone 200 is depicted in FIG. 2 as having multiple propellers, in another embodiment a single propeller elevates and adjusts pitch and roll of the flying drone while a rotor adjusts yaw of the flying drone using a set of positioning sensors (e.g., gyroscopes) that cause the propeller and rotor to change attitude. Similar positioning sensors can likewise adjust the attitude of multiple propellers.

In an embodiment of the present invention, flying drone 200 is "miniaturized", thus allowing it to be flown in confined spaces, such as between silos, pressure vessels, used tires, etc. That is, in this embodiment a maximum dimension of flying drone 200 may be less than 6 inches, or even less than one inch, based on the level of available miniaturized components.

In an embodiment of the present invention, a sensor 215 is affixed to body 202 of flying drone 200. Sensor 215 is capable of detecting features of a standing body of water, in order to determine whether or not it is stagnant. For example, sensor 215 may be a chemical sensor, a heat sensor, a moisture sensor, etc., which singularly or in combination are able to determine is a body of water displays characteristics of a stagnant body of water. For example, if a body of water is warm (as detected by a heat sensor), is still (as detected by camera 226), is emitting odors/chemicals such as methane gas that are characteristic of stagnant water (as detected by a chemical sensor), then that body of water is determined to be stagnant by the flying drone 200.

In an embodiment of the present invention, an electronic mosquito eliminator 236 is affixed to the body 202 of the flying drone 200. Electronic mosquito eliminator 236 may be an electrically charged grid that electrocutes mosquitoes as they strike against the electronic mosquito eliminator 236. In another embodiment, electronic mosquito eliminator 236 is a laser device that is able to track and fire a low-energy laser beam at one or more mosquitoes, thus eliminating them.

In an embodiment of the present invention, a mechanical water agitator 238 is affixed to the body 202 of flying drone 200. If the drone on-board computer 223 (or a supervisory system such as drone manager 401 shown in FIG. 4) determines that a body of water is stagnant, then drone on-board computer 223 will fly close enough to that body of water such that the beater 240 portion of the mechanical water agitator 238 is inserted into the water. The mechanical water agitator 238 then turns the beater 240 on in order to stir up (agitate) the water, thus disrupting any mosquito larvae/eggs that have been laid on top of the water.

Figure 3:
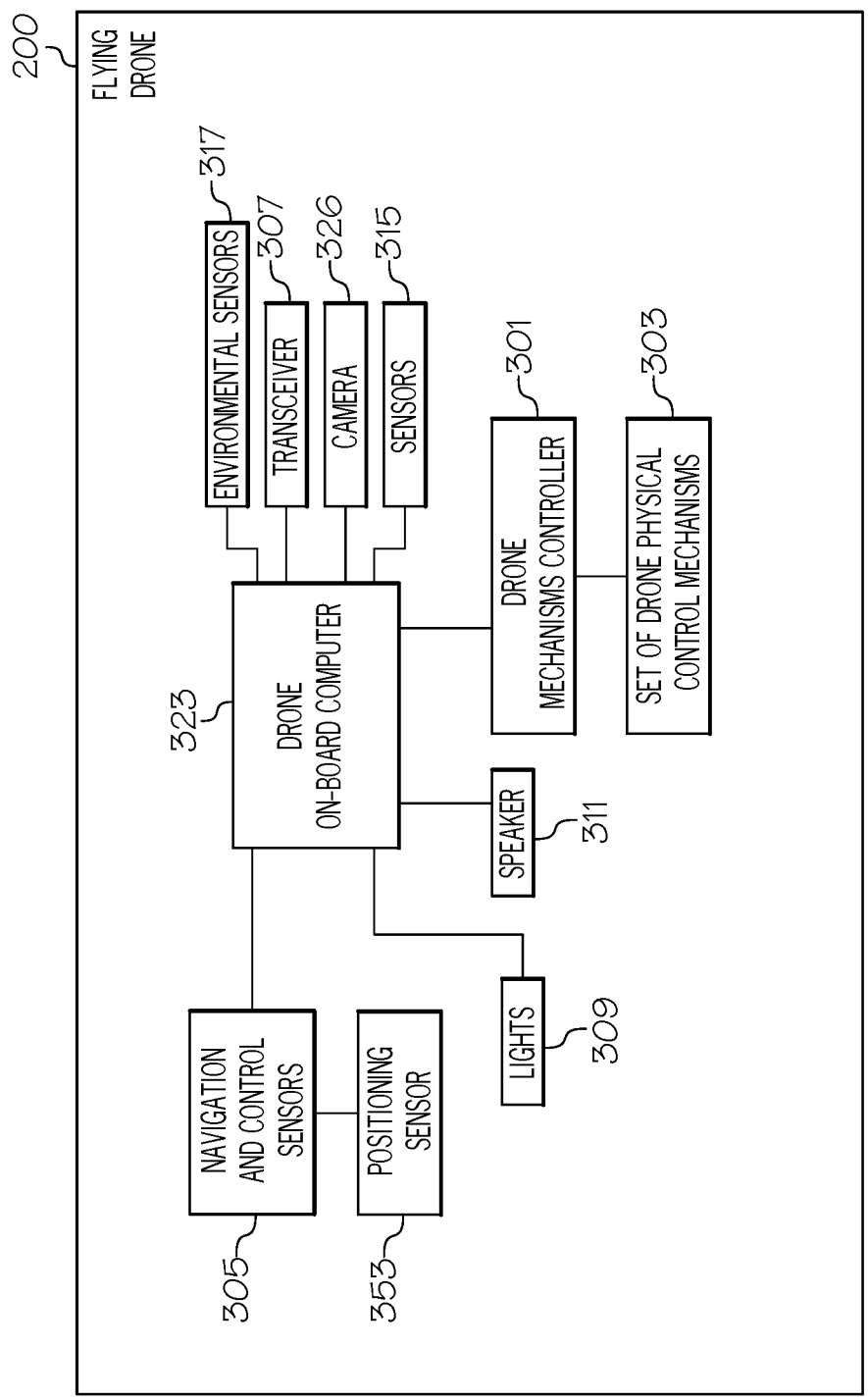
FIG. 3 illustrates control hardware and other hardware features of an exemplary flying drone in accordance with one or more embodiments of the present invention.

With reference now to FIG. 3, exemplary control hardware and other hardware components within the flying drone 200 presented in FIG. 2 are depicted.

A drone on-board computer 323 (analogous to drone on-board computer 223 shown in FIG. 2) controls a drone mechanism controller 301, which is a computing device that controls a set of drone physical control mechanisms 303. The set of drone physical control mechanisms 303 include, but are not limited to, throttles for electric motor 216, selectors for selecting gear ratios within the geared transmission 214, controls for adjusting the pitch, roll, and angle of attack of propellers such as propeller 210 and other controls used to control the operation and movement of the flying drone 200 depicted in FIG. 2.

Whether in autonomous mode or remotely-piloted mode (based on control signals sent via computer 101 to the drone on-board computer 123 shown in FIG. 1), the drone on-board computer 323 controls the operation of flying drone 200. This control includes the use of outputs from navigation and control sensors 305 to control the flying drone 200. Navigation and control sensors 305 include hardware sensors that (1) determine the location of the flying drone 200; (2) sense pests and/or other flying drones and/or obstacles and/or physical structures around flying drone 200; (3) measure the speed and direction of the flying drone 200; and (4) provide any other inputs needed to safely control the movement of the flying drone 200.

With respect to the feature of (1) determining the location of the flying drone 200, this is achieved in one or more embodiments of the present invention through the use of a positioning system such as positioning system 151 (shown in FIG. 1), which may be part of the drone on-board computer 323, combined with positioning sensor 353. Positioning system 151 may use a global positioning system (GPS), which uses space-based satellites that provide positioning signals that are triangulated by a GPS receiver to determine a 3-D geophysical position of the flying drone 200. Positioning system 151 may also use, either alone or in conjunction with a GPS system, physical movement sensors such as accelerometers (which measure changes in direction and/or speed by a flying drone in any direction in any of three dimensions), speedometers (which measure the instantaneous speed of a flying drone), air-flow meters (which measure the flow of air around a flying drone), barometers (which measure altitude changes by the flying drone), etc. Such physical movement sensors may incorporate the use of semiconductor strain gauges, electromechanical gauges that take readings from drivetrain rotations, barometric sensors, etc.

With respect to the feature of (2) sensing pests and/or other flying drones and/or obstacles and/or physical structures around flying drone 200, the drone on-board computer 323 may utilize radar or other electromagnetic energy that is emitted from an electromagnetic radiation transmitter (e.g., transceiver 307 shown in FIG. 3), bounced off a physical structure (e.g., a pest, a swarm of pests, a building, bridge, another flying drone, etc.), and then received by an electromagnetic radiation receiver (e.g., transceiver 307). By measuring the time it takes to receive back the emitted electromagnetic radiation, and/or evaluate a Doppler shift (i.e., a change in frequency to the electromagnetic radiation that is caused by the relative movement of the flying drone 200 to objects being interrogated by the electromagnetic radiation) in the received electromagnetic radiation from when it was transmitted, the presence and location of other physical objects can be ascertained by the drone on-board computer 323.

With respect to the feature of (3) measuring the speed and direction of the flying drone 200, this is accomplished in one or more embodiments of the present invention by taking readings from an on-board airspeed indicator (not depicted) on the flying drone 200 and/or detecting movements to the control mechanisms (depicted in FIG. 2) on the flying drone 200 and/or the positioning system 151 discussed above.

With respect to the feature of (4) providing any other inputs needed to safely control the movement of the flying drone 200, such inputs include, but are not limited to, control signals to fly the flying drone 200, to land flying drone 200 (e.g., to make an emergency landing), etc.

Also on flying drone 200 in one or more embodiments of the present invention is a camera 326, which is capable of sending still or moving visible light digital photographic images (and/or infrared heat digital photographic images) to the drone on-board computer 323. Besides capturing images of pests as described herein, camera 326 is able to capture images of physical objects. These images can be used to determine the location of the flying drone 200 (e.g., by matching to known landmarks), to sense other drones/obstacles, and/or to determine speed (by tracking changes to images passing by), as well as to receive visual images of pests as described herein.

Also on flying drone 200 in one or more embodiments of the present invention are sensors 315. Examples of sensors 315 include, but are not limited to, air pressure gauges, microphones, barometers, chemical sensors, vibration sensors, etc., which detect a real-time operational condition of flying drone 200 and/or an environment around flying drone 200. Another example of a sensor from sensors 315 is a light sensor, which is able to detect light from other drones, street lights, home lights, etc., in order to ascertain the environment in which the flying drone 200 is operating.

Also on flying drone 200 in one or more embodiments of the present invention are lights 309. Lights 309 are activated by drone on-board computer 323 to provide visual warnings, alerts, etc. that warn persons/other drones of the presence of flying drone 200 and/or the activities of flying drone 200 (e.g., dispensing pesticides, etc.).

Also on flying drone 200 in one or more embodiments of the present invention is a speaker 311. Speaker 311 is used by drone on-board computer 323 to provide aural warnings, alerts, etc. That is, once the flying drone 200 detects a certain type of pest(s), an aural alert (e.g., an intense warning sound broadcast by speaker 311 on the flying drone 200) may be sounded, warning persons of the proximity of the flying drone 200.

Also on flying drone 200 in one or more embodiments of the present invention are environmental sensors 317, which sense an environment around a body of water being monitored. Examples of environmental sensors 317 include, but are not limited to, cameras (that capture a visual image of an environment around a body of water being monitored), chemical sensors (that capture ambient scents around the body of water being monitored), microphones (that capture ambient sounds around the body of water being monitored), positioning sensors (e.g., GPS-based devices that determine a geophysical location of the body of water being monitored), etc.

Figure 4:
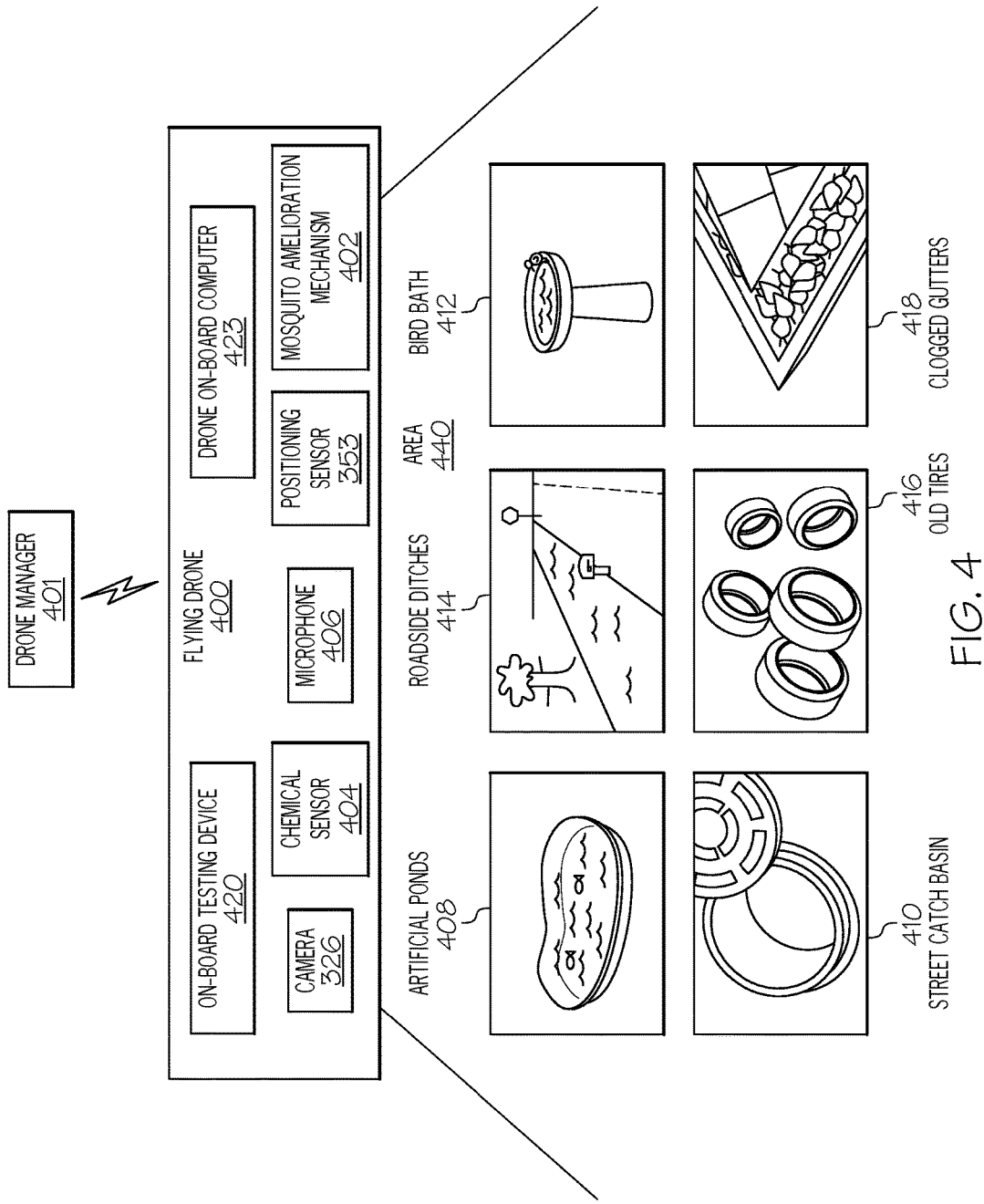
FIG. 4 depicts a flying drone being utilized to control mosquitoes in accordance with one or more embodiments of the present invention.

With reference now to FIG. 4, an exemplary flying drone 400 (analogous to flying drone 200 shown in FIG. 2 and FIG. 3) is depicted in use according to one or more embodiments of the present invention while flying over an area 440. Flying drone 400 may be entirely autonomous, or it may be under the direction of a drone manager 401.

Flying drone 400 has a body of water sensor, an environmental sensor, a drone on-board computer, and a mosquito abatement mechanism. As described herein, the body of water sensor and the environmental sensor may be a same sensor, or may utilize different embodiments of a same depicted sensor.

For example, the body of water sensor may be a combination of one or more of the camera 326, the chemical sensor 404 (i.e., a sensor hardware device capable of detecting airborne chemicals), and the microphone 406 (e.g., which detects an absence of sound created by running water, thus indicating stagnant water), all as depicted in FIG. 4. As such, this body of water sensor is directed to a particular body of water, such as that found in artificial ponds 408, a street catch basin 410, a bird bath 412, roadside ditches 414, old tires 416, clogged cutters 418, etc. Examples of such emissions include, but are not limited to, light reflections (i.e., a visual image of the water, including a presence of scum on top of the water, etc.), chemical emissions (i.e., odors that are typical of stagnant water, such as that produced by methane, decomposing biomasses, etc.), and/or the lack of sound emissions (i.e., the lack of sounds of moving water, thus indicating that the water being observed is stagnant).

Similarly, the environmental sensor may be a combination of one or more of the camera 326, the chemical sensor 404, the microphone 406, and the positioning sensor 353 depicted in FIG. 4. As such, this environmental sensor is directed to an environment (i.e., the space surrounding the body of water being monitored/tracked by the body of water sensor) around the particular body of water, such as those depicted in FIG. 4.

The drone on-board computer 423 identifies a water type (i.e., stagnant or non-stagnant) of the body of water being monitored based on the emission from the body of water, and also establishes a risk level posed by the presence of the pest based on the pest type and the environment of the pest.

Examples of mosquito amelioration mechanism 402 include mechanical, chemical, light, and other abatement mechanisms. For example, mosquito amelioration mechanism 402 may be the combination of reservoir 234, pump 232, and nozzle 230 shown in FIG. 2 for spraying pesticide, etc. on the body of water in order to disturb or kill the mosquito larvae in the water. In another embodiment, mosquito amelioration mechanism 402 is a mechanical device (e.g., mechanical water agitator 238 shown in FIG. 2) that can roil the water, thereby disrupting the mosquito larvae on the surface of the water. In another embodiment, the mosquito amelioration mechanism 402 may be the propeller 210 shown in FIG. 2, which generates sufficient wind (prop wash) to stir up the water, thus damaging the larvae on the surface of the water (and/or all of the water in a small puddle).

Also on board the flying drone 400 shown in FIG. 4 is an on-board testing device 420. On-board testing device 420 is capable of retrieving a sample (e.g., using a pipette system, etc.) of water from one of the standing water sources shown in FIG. 4. On-board testing device 420 includes a photosensor, a chemical sensor, etc. that is calibrated to detect the presence of mosquito larvae. That is, mosquito eggs/larvae from the water sample will be a certain color, which is recognized by the photosensor in the on-board testing device 420. Similarly certain mosquito eggs/larvae will produce a unique smell (i.e., scent), which can be detected by a chemical sensor in the on-board testing device 420. Thus, the flying drone is able to act as a "mobile laboratory" capable of identifying the presence of mosquito eggs and/or larvae in the water sample obtained by the flying drone 400 from the stagnant water source.

Figure 5:
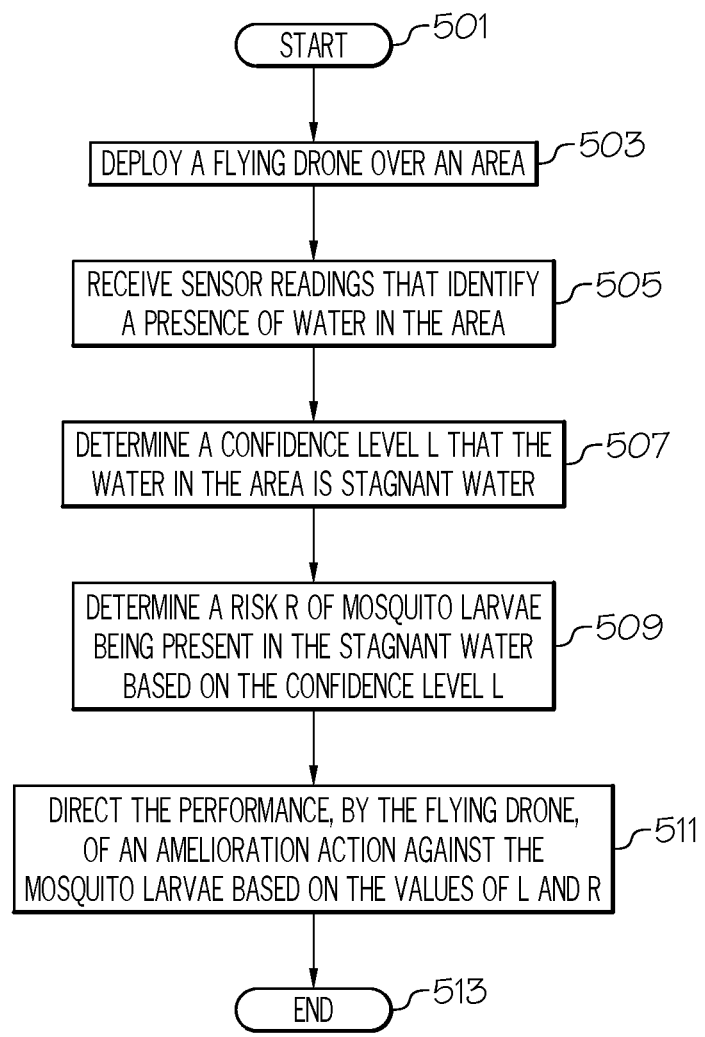
FIG. 5 is a high-level flow chart of one or more steps performed by one or more computing devices and/or a flying drone and/or other hardware devices to ameliorate a mosquito problem in accordance with one or more embodiments of the present invention.

With reference now to FIG. 5, a high level flow chart of one or more steps performed by one or more processors and/or other hardware devices to ameliorate a mosquito problem based on risk analysis and pattern classifiers is presented.

After initiator block 501, a flying drone (e.g., flying drone 400 shown in FIG. 4) is deployed over an area (e.g., area 440 shown in FIG. 4), as described in block 503 of FIG. 5.

As described in block 505 of FIG. 5, one or more processors (e.g., within the drone manager 401 and/or within the drone on-board computer 423) receive sensor readings (e.g., from camera 326, chemical sensor 404, etc., shown in FIG. 4) that identify a presence of water (e.g., within the bird bath 412 shown in FIG. 4) in the area.

As described in block 507, one or processors (e.g., within the drone manager 401 and/or within the drone on-board computer 423), determine a confidence level L that the water in the area is stagnant water. In one or more embodiments, this is achieved through the use of pattern recognition and/or deep neural networks that are able to utilize the sensor data to identify stagnant water.

As described in block 509, one or more processors (e.g., within the drone manager 401 and/or within the drone on-board computer 423) determine a risk R of mosquito larvae being present in the stagnant water based on the confidence level L. In one or more embodiments, this is achieved through the use of pattern recognition and/or deep neural networks that are able to utilize the confidence level L in order to establish the likelihood that the observed body of water is in fact stagnant, and that other conditions (e.g., temperature, known presence of mosquitoes in the area, etc.) are conducive to mosquitoes breeding in the identified stagnant water.

As described in block 511, one or more processors (e.g., within the drone manager 401 and/or within the drone on-board computer 423) direct the flying drone, to perform an amelioration action against the mosquito larvae based on the values of L and R. Examples of such amelioration include, but are not limited to, deploying an insecticide from the flying drone, deploying an insect repellant from the flying drone, deploying an insect trap from the flying drone, deploying natural biologic mosquito enemies from the flying drone, deploying artificial breeding facilities that are lethal to the mosquito larvae from the flying drone, activating mosquito lasers from the flying drone, activating an electrical mosquito eliminator on the flying drone, the flying drone inserting the mechanical agitator into the stagnant water to agitate the stagnant water, the flying drone agitating the stagnant water by flying close enough to the stagnant water to cause water movement from wind generated by the flying drone's propellers, etc.

The flow chart shown in FIG. 5 ends at terminator block 513.

As described herein, in one or more embodiments of the present invention one or more processors determine the confidence level L based on image classification of images of the water produced by the flying drone, where the image classification is performed by image pattern classifications performed by a deep neural network. That is, the deep neural network provides the cognitive ability to recognize still, stagnant waters that are conducive to mosquito breeding activities.

In one or more embodiments of the present invention one or more processors determine the risk R by matching past incidents of stagnant water to a presence of mosquito larvae as identified by a deep neural network. That is, the deep neural network may have access to a historical database that shows that whenever water of a certain depth, stillness, temperature, etc. (as determined by sensors on the flying drone) is in the known presence of mosquitoes, then these mosquitoes will lay their eggs on water having these characteristics.

In an embodiment of the present invention, the flying drone captures a sample of the water. An on-board testing device (e.g., on-board testing device 420 shown in FIG. 4) on the flying drone then examines the sample to determine a level of mosquito larvae presence in the water. One or more processors (e.g., in the drone on-bard computer 423) then adjust the risk R based on the level of mosquito larvae present in the water.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
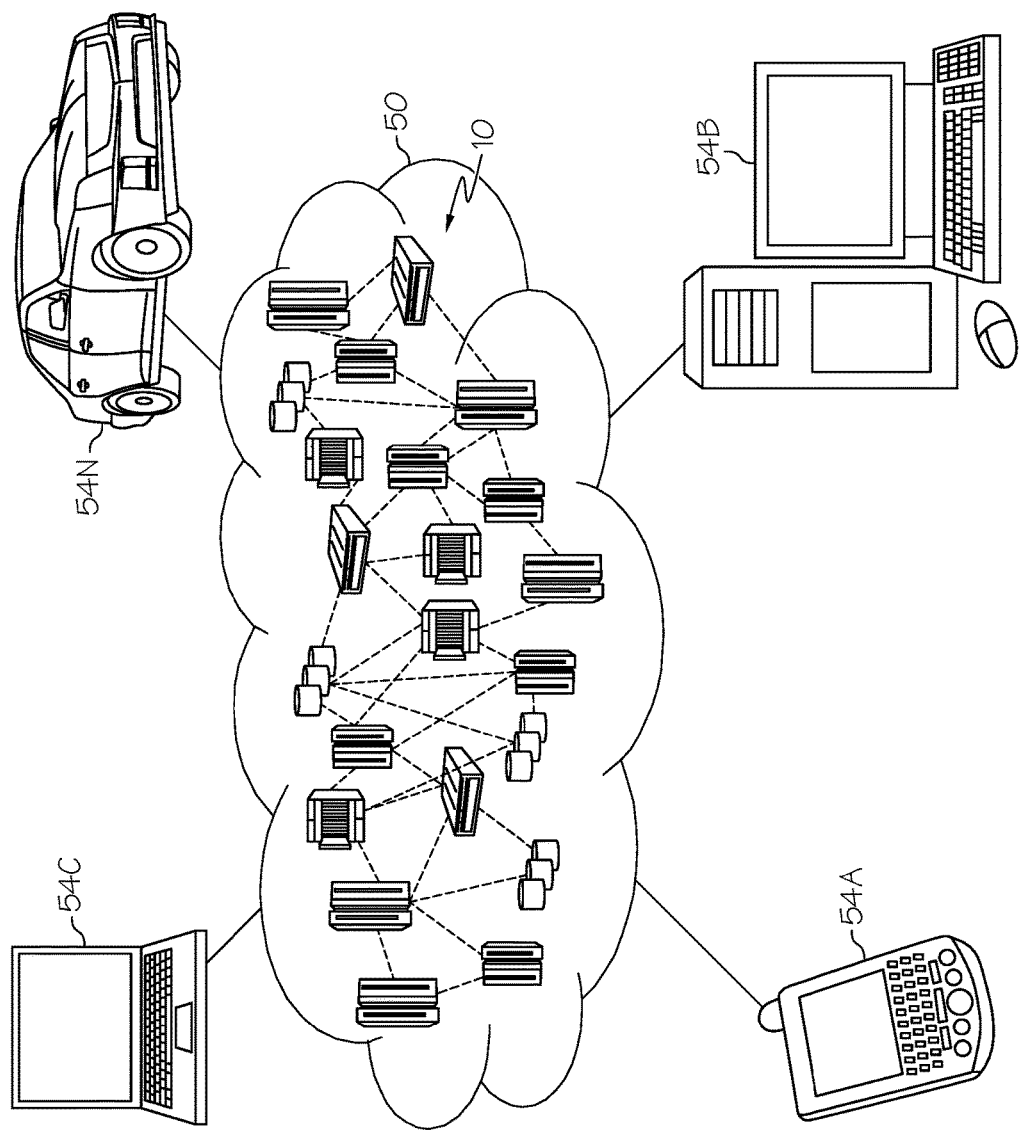
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
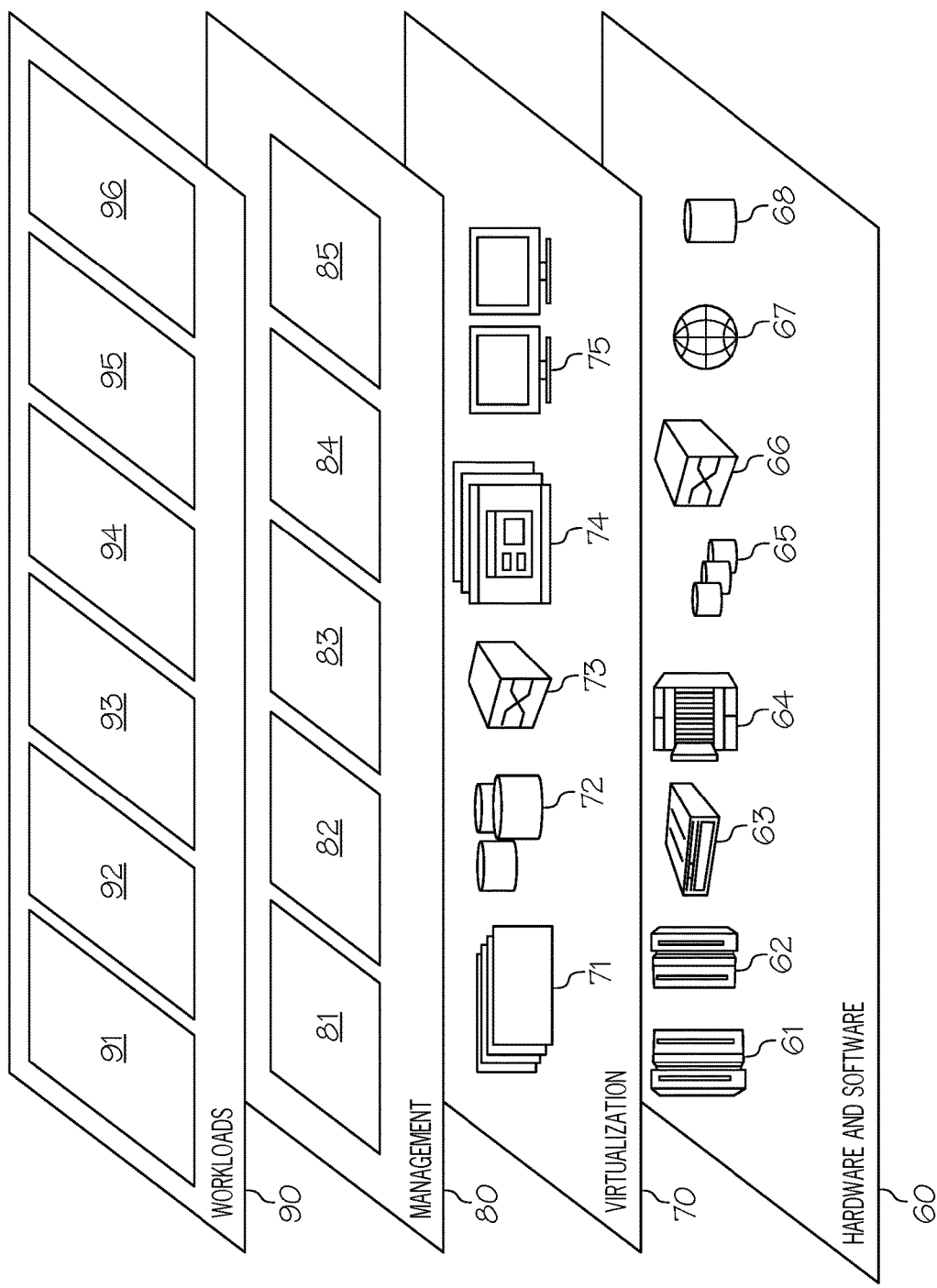
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and flying drone control processing 96, which performs one or more of the mosquito problem abatement processes described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A flying drone-based method of mosquito amelioration, the flying drone-based method comprising:
   deploying a flying drone over an area;
   receiving, by one or more processors, sensor readings that identify a presence of water in the area;
   determining, by one or processors, a confidence level L that the water in the area is stagnant water; and
   directing, by one or more processors, the flying drone to perform an amelioration action against potential mosquito larvae in the stagnant water based on a value of the determined confidence level L exceeding a predefined value.

2. The flying drone-based method of claim 1, further comprising:
   determining, by one or more processors, the confidence level L based on image classification of images of the water produced by the flying drone, wherein the image classification is performed by image pattern classifications performed by a deep neural network.

3. The flying drone-based method of claim 1, further comprising:
   determining, by one or more processors, a risk R of mosquito larvae being present in the stagnant water by matching past incidents of stagnant water to a presence of mosquito larvae as identified by a deep neural network.

4. The flying drone-based method of claim 1, wherein the amelioration action is from a group consisting of deploying an insecticide from the flying drone, deploying an insect repellant from the flying drone, deploying an insect trap from the flying drone, deploying natural biologic mosquito enemies from the flying drone, deploying artificial breeding facilities that are lethal to the mosquito larvae from the flying drone, activating mosquito lasers from the flying drone, and activating an electrical mosquito eliminator on the flying drone.

5. The flying drone-based method of claim 1, wherein the flying drone comprises a mechanical agitator, and wherein the amelioration action comprises the flying drone inserting the mechanical agitator into the stagnant water to agitate the stagnant water.

6. The flying drone-based method of claim 1, wherein the confidence level L is determined by economic conditions associated with the area.

7. The flying drone-based method of claim 1, further comprising:
   capturing, by the flying drone, a sample of the water;
   examining, by an on-board testing device on the flying drone, the sample to determine a level of mosquito larvae presence in the water; and
   adjusting, by one or more processors, the risk R based on the level of mosquito larvae present in the water.

8. A computer program product for ameliorating mosquitoes by a flying drone, the computer program product comprising a non-transitory computer readable storage medium having program code embodied therewith, the program code readable and executable by a processor to perform a method comprising:
   deploying a flying drone over an area;
   receiving sensor readings that identify a presence of water in the area;
   determining a confidence level L that the water in the area is stagnant water; and
   directing the flying drone to perform an amelioration action against potential mosquito larvae in the stagnant water based on a value of the determined confidence level L exceeding a predefined value.

9. The computer program product of claim 8, wherein the method further comprises:
   determining, by one or more processors, the confidence level L based on image classification of images of the water produced by the flying drone, wherein the image classification is performed by image pattern classifications performed by a deep neural network.

10. The computer program product of claim 8, wherein the method further comprises:

determining a risk R of mosquito larvae being present in the stagnant water by matching past incidents of stagnant water to a presence of mosquito larvae as identified by a deep neural network.

11. The computer program product of claim 8, wherein the amelioration action is from a group consisting of deploying an insecticide from the flying drone, deploying an insect repellant from the flying drone, deploying an insect trap from the flying drone, deploying natural biologic mosquito enemies from the flying drone, deploying artificial breeding facilities that are lethal to the mosquito larvae from the flying drone, activating mosquito lasers from the flying drone, and activating an electrical mosquito eliminator on the flying drone.

12. The computer program product of claim 8, wherein the flying drone comprises a mechanical agitator, and wherein the amelioration action comprises the flying drone inserting the mechanical agitator into the stagnant water to agitate the stagnant water.

13. The computer program product of claim 8, wherein the confidence level L is determined by economic conditions associated with the area.

14. The computer program product of claim 8, wherein the method further comprises:
   capturing, by the flying drone, a sample of the water;
   examining, by an on-board testing device on the flying drone, the sample to determine a level of mosquito larvae presence in the water; and
   adjusting the risk R based on the level of mosquito larvae present in the water.

15. A computer system comprising:
   one or more processors;
   one or more computer readable memories; and
   one or more non-transitory computer readable storage mediums, wherein program instructions are stored on at least one of the one or more non-transitory storage mediums for execution by at least one of the one or more processors via at least one of the one or more computer readable memories to perform a method comprising:
   deploying a flying drone over an area;
   receiving sensor readings that identify a presence of water in the area;
   determining a confidence level L that the water in the area is stagnant water; and
   directing the flying drone to perform an amelioration action against potential mosquito larvae in the stagnant water based on a value of the determined confidence level L exceeding a predefined value.

16. The computer system of claim 15, wherein the method further comprises:
   determining, by one or more processors, the confidence level L based on image classification of images of the water produced by the flying drone, wherein the image classification is performed by image pattern classifications performed by a deep neural network.

17. The computer system of claim 15, wherein the method further comprises:
   determining a risk R of mosquito larvae being present in the stagnant water by matching past incidents of stagnant water to a presence of mosquito larvae as identified by a deep neural network.

18. The computer system of claim 15, wherein the flying drone comprises a mechanical agitator, and wherein the amelioration action comprises the flying drone inserting the mechanical agitator into the stagnant water to agitate the stagnant water.

19. The computer system of claim 15, wherein the confidence level L is determined by economic conditions associated with the area.

20. The computer system of claim 15, wherein the method further comprises:
   capturing, by the flying drone, a sample of the water;
   examining, by an on-board testing device on the flying drone, the sample to determine a level of mosquito larvae presence in the water; and
   adjusting the risk R based on the level of mosquito larvae present in the water.

* * * * *